United States Patent Office 3,418,362
Patented Dec. 24, 1968

3,418,362
CARBAMATES
Hilary F. Goonewardene, Moorestown, N.J., and Bernard Loev, Broomall, Pa., assignors to Smith Kline & French Laboratories, Philadelphia, Pa., a corporation of Pennsylvania
No Drawing. Filed Dec. 11, 1964, Ser. No. 417,773
6 Claims. (Cl. 260—482)

This invention relates to new chemical compounds and to insecticidal formulations containing them. More particularly, the present invention relates to certain derivatives of halogenated 5-alkyl bicyclo[2.2.1]-2-heptene, which may be represented by the general formula:

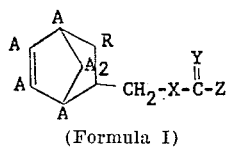

(Formula I)

wherein

A is selected from the group consisting of hydrogen, chlorine and bromine with at least four of the A's being halogen;
R is selected from the group consisting of hydrogen, lower alkyl having up to 5 carbon atoms, halogen, and

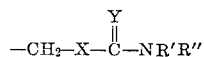

X is selected from the group consisting of oxygen, sulfur, and —NH—;
Y is selected from the group consisting of oxygen and sulfur; and
Z is selected from the group consisting of —NR'R", —OR''' and —SR''';
both R' and R" are selected from the group consisting of hydrogen, lower alkyl, aromatic hydrocarbon and lower cycloalkyl; and
R''' is selected from the group consisting of lower alkyl and aromatic hydrocarbon.

Advantageous compounds are those above where A is chlorine and R is hydrogen.
Especially preferred compounds as insecticides are those where X and Y are oxygen and Z is NR'R".
Illustrative of such compounds are:

5-carbamyloxymethyl-1,2,3,4,7,7-hexachlorobicyclo [2.2.1]-2-heptene.
N-methyl-5-carbamyloxy-1,2,3,4,7,7-hexachlorobicyclo [2.2.1]-2-heptene.
N-ethyl-5-carbamyloxymethyl-1,2,3,4,7,7-hexachlorobicyclo[2.2.1]-2-heptene.
N-propyl-5-carbamyloxymethyl-1,2,3,4,7,7-hexachlorobicyclo[2.2.1]-2-heptene.
5,6-bis-(carbamyloxymethyl)-1,2,3,4,7,7-hexachlorobicyclo[2.2.1]-2-heptene.
5-carbamyloxymethyl-1,1,2,3,4,7,7-hexabromobicyclo[2.2.1]-2-heptene.
N-methyl-5-carbamyloxymethyl-1,2,3,4,7,7-hexabromobicyclo[2.2.1]-2-heptene.
5-carbamylthiomethyl-1,2,3,4,7,7-hexachlorobicyclo[2.2.1]-2-heptene.
N-methylcarbamylthiomethyl-1,2,3,4,7,7-hexachlorobicyclo[2.2.1]-2-heptene.
5-(N,N-diethylcarbamyloxymethyl)-1,2,3,4,7,7-hexachlorobicyclo[2.2.1]-2-heptene.
5-thiocarbamyloxymethyl-1,2,3,4,7,7-hexachlorobicyclo[2.2.1]-2-heptene.
N-methyl-5-thiocarbamyloxymethyl-1,2,3,4,7,7-hexachlorobicyclo[2.2.1]-2-heptene.
5-thiocarbamylthiomethyl-1,2,3,4,7,7-hexachlorobicyclo[2.2.1]-2-heptene.
N-methyl-5-thiocarbamylthiomethyl-1,2,3,4,7,7-hexachlorobicyclo[2.2.1]-2-heptene.
5-dithiocarbethoxyoxymethyl-1,2,3,4,7,7-hexachlorobicyclo[2.2.1]-2-heptene.
5-carbethoxyoxymethyl-1,2,3,4,7,7-hexachlorobicyclo [2.2.1]-2-heptene.
N-phenylcarbamyl-1,2,3,4,7,7-hexachlorobicyclo [2.2.1]-2-heptene.
Ethylthiocarbamyloxy-1,2,3,4,7,7-hexachlorobicyclo [2.2.1]-2-heptene.
5-ureidomethyl-1,2,3,4,7,7-hexachlorobicyclo [2.2.1]-2-heptene.

An increasingly significant trend in pest control is the growing number of species of pests, particularly insects which are resistant to the standard pesticides comprised of halogenated hydrocarbon organic phosphates.

One solution to the resistant pest lies in the search for newer types of pesticides, typically the less hazardous and the more selective carbamates. However, it is also known that specific insects are resistant to specific carbamates.

We have developed novel compounds derived from a halogenated hydrocarbon which has been combined with an alkyl carbamate moiety as well as the thio analogs thereof.

It is an object of this invention to provide a new pesticidal composition. It is another object of this invention to provide a method of combating economic pests. It is still a further object to provide novel syntheses for the insecticidal composition of this invention.

The compounds of this invention may be prepared generally by reacting polyhalocyclopentadiene with an alkenol forming an intermediate, termed the alkenyl alcohol adduct of the polyhalocyclopentadine. This intermediate is reacted with any of a choice of reagents to yield carbamyloxyalkyl derivatives of the adduct or their thio analogs as well as N-alkyl derivatives of the unsubstituted carbamates of Formula III.

The above described reactions may be represented schematically by the following general equations:

(Method A)

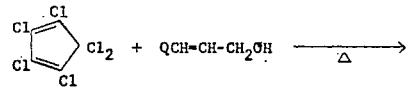

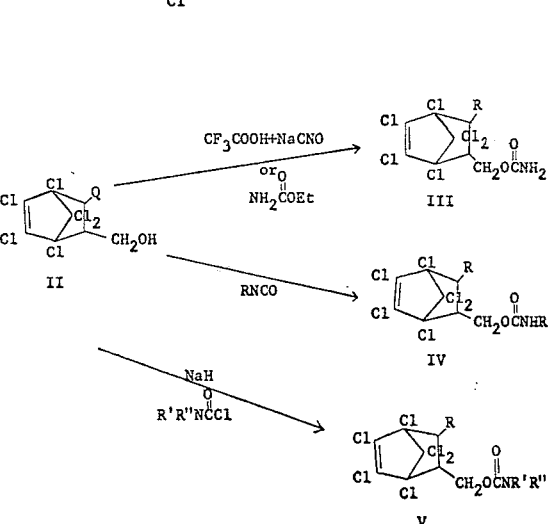

wherein

Q is selected from the group consisting of H, lower alkyl up to 5 carbon atoms, halogen, or —CH₂OH; and R, R', R" are as defined above.

Generally, starting with the allyl alcohol adduct of a polyhalogenated cyclopentadiene dissolved in a non-polar solvent such as benzene, one may use any of a number of reagents or combinations of reagents to yield the carbamate analog or mono- or di-N-substituted carbamates as typified by Formulas III, IV and V, respectively. The syntheses of each of the three variations of Method A are outlined below.

In a first procedure, the allyl alcohol adduct of a polyhalogenated cyclopentadiene is reacted with an alkali metal cyanate in an inert solvent, followed by addition of trifluoroacetic acid. After stirring for up to several hours, water is added and the resulting organic layer is conventionally separated and concentrated, finally giving a low melting crystalline solid, a 5-carbamyloxy derivative.

In order to prepare a 5′,6-bis-(carbamyloxyalkyl) or aryl derivative of the alcohol adduct of Formula II, butene 1,4-diol is substituted for allyl alcohol, giving the 5,6-bis alcohol adduct. A 5,6-bis-(carbamyloxyalkyl) derivative of this adduct results when employing higher equivalents of the reagents disclosed above.

In the second modification of Method A, a lower alkyl isocyanate and a suitable catalyst are added to a solution of the alcohol adduct in an inert solvent. After stirring for up to several hours, followed by a brief refluxing period, the solution is concentrated, sublimed to about 50° C. to remove unreacted alcohol and then raised to about 100° C. to sublime off the product, an N-lower alkyl derivative.

In the third modification, the adduct is reacted first with an alkali metal hydride until hydrogen evolution ceases then with a selected N,N-di(lower alkyl)carbamyl halide. Stirring at room temperature, stirring is continued for up to 18 hours. Upon addition of water, the mixture is extracted. The resulting organic layer is separated and sublimed as in the previous modification.

Method A can also be conveniently employed to prepare compounds of Formula I wherein X is sulfur, Y is oxygen, and Z is NR′R″ by substituting allyl mercaptan for allyl alcohol.

In another synthesis, polyhalocyclopentadiene is reacted with an alkenyl substituted carbamate to obtain directly the active compounds of Formula V. This synthesis is represented graphically by the following general reaction:

(Method B)

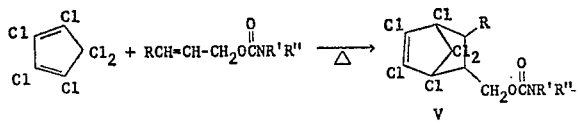

wherein R, R′ and R″ are as defined above.

In this method, a polyhalocyclopentadiene is reacted with a suitable N,N-dialkylallylcarbamate in a nonpolar solvent. The mixture is refluxed for up to 24 hours after which the solvent layer is removed. The remaining product layer is distilled to purify the product, and N,N-dialkyl carbamyloxymethylpolyhalobicyclo[2.2.1] - 2 - heptene.

Method B can also be utilized to prepare compounds of Formula I wherein X is —NH—, Y is oxygen, and Z is —NR′R″ by substituting allyl urea for allyl carbamate.

A third synthetic pathway, again starting with a hexahalocyclopentadiene, employs $COCl_2$ and then a diamine to yield the intermediates of Formula V below. This pathway is represented schematically by the following general reaction:

(Method C)

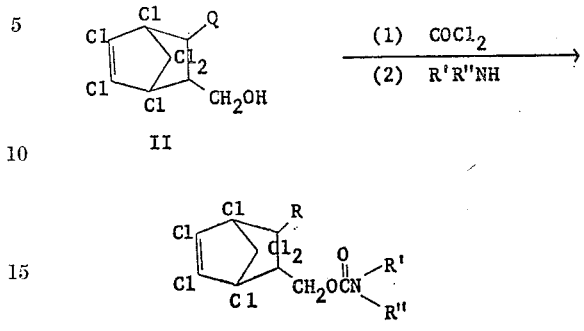

wherein Q, R, R′ and R″ are as defined above.

In Method C, to a nonpolar solution of the previously described alcohol adduct, phosgene in anhydrous hydrocarbon is slowly added while maintaining temperature below 25° C., the intermediate of Formula V resulting.

This intermediate is next reacted with a dilower alkylamine in ether. The reaction mixture is stirred for up to one hour then filtered and distilled to yield the product, an N,N-di(alkyl)carbamyloxymethylpolyhalobicyclo[2.2.1]-2-heptene.

Method C can be conveniently employed to prepare the compounds of Formula I wherein X and Y are oxygen and Z is —OR‴ or —SR‴ by substituting R‴OH or R‴SH for the diamine reagent.

Method C can be readily utilized to prepare compounds of Formula I wherein X is oxygen, Y is sulfur, and Z is —NR′R″ by employing thiophosgene in place of phosgene.

An alternative starting material is a tetrahalocyclopentadiene which will undergo the same reactions giving analogous compounds having pesticidal properties.

The insecticidal compositions of this invention are produced by admixing the compounds of this invention with a suitable diluent, which is an inert material, to facilitate the mechanical distribution of the toxicant. Inert materials to facilitate the mechanical distribution of the toxicant are added for the purposes outlined in Frear (Chemistry of Insecticides, Fungicides, and Herbicides by Donald E. H. Frear, second edition, 1948, p. 5) to form sprays, dusts, and aerosols from the adducts. Surface-active dispersing agents are used in admixture with the compounds to promote the spreading of the toxic material and thereby improve its effectiveness through assuring contact between organism and toxicant. They are used in both aqueous and dry formulations.

In general, compositions containing from about 0.01 to 85% of active ingredient or 100 to 850,000 parts per million of the formulation in either a liquid or solid carrier give excellent results from use in this concentration range. The recited upper limit may be employed in non-agricultural applications. A preferred range for optimum biological effectiveness is from 0.1 to 25% of active ingredient, i.e. 1000 to 250,000 parts per million.

Liquid carriers which may be employed include water, mineral oils, and organic solvents, as well as other solvents, including wetting and suspending agents. Solid carriers which may be employed are talc; bentonite; attapulgite; diatomaceous earth, silica; synthetic precipitated silica; pyrophyllite, Fuller's earth; lime; gypsum; and flour derived from cotton seeds, walnut shells, corn cobs, or other similar powders.

The composition may also contain additives such as wetting agents, binding agents, gases compressed to the liquid stage, odorants, stabilizers, and the like. The compositions can be applied as dispensing liquid sprays or gas-propelled sprays.

The pesticidal mixture of the present invention is particularly useful for spray compositions. It is frequently the practice in the art to manufacture a composition containing the active ingredient of the formulation in larger amounts than would normally be utilized in the pesticidal spraying operation.

Such a composition is called a concentrate formulation (e.g. "dust" or "emulsion") and ranges up to 95 parts of active ingredient per 100 parts of formulation. Such concentrates are so formulated that by a proper and usually predetermined degree of dilution of the concentrates, a desired formulation pesticide may be produced as desired. Concentrates containing the novel pesticide of our invention may be prepared by methods known in the art.

Various modifications and alterations of this invention will become apparent to those skilled in the art without departing from the scope and spirit of the invention, and it should be understood that the latter is not necessarily limited to the aforementioned disclosure.

EXAMPLE 1

Preparation of 5 - carbamyloxymethyl - 1,2,3,4,7,7 - hexachlorobicyclo[2.2.1]-2-heptene of the structural Formula III (Method A)

Employing the procedure of Loev and Kormendy, J. Org. Chem., 28:3421 (1963), 0.1 mole of sodium cyanate is added to a solution of 0.045 mole of the allyl alcohol adduct of hexachlorocyclopentadiene (II) dissolved in 150 cc. benzene, with stirring; then 0.1 mole of trifluoroacetic acid is added over 5 minutes. After stirring for 4 hours, there is added 50 cc. $H_2O$. The resulting organic layer is separated, dried, and is concentrated, leaving a viscous orange oil. This is molecularly distilled. On long standing, the oil crystallizes to a low melting solid identified as 5-carbamyloxymethyl-1,2,3,4,7,7-hexachlorobicyclo[2.2.1]-2-heptene.

EXAMPLE 2

Preparation of 5-(N-methylcarbamyloxymethyl)-1,2,3,4,7,7-hexachlorobicyclo[2.2.1]-2-heptene of the structural Formula IV (Method A)

One and seventy-one hundredths grams of methylisocyanate and 0.1 g. of Dabco catalyst (triethylene diamine) are added to a solution of 10 g. of the same allyl alcohol adduct of Example 1 in 100 cc. hexane. The solution is stirred at room temperature for 3 hours, refluxed for 10 minutes and then the solution is concentrated in vacuo. The crude residue may be used as is or partially purified in the following way.

The residue is heated in a sublimation apparatus at 50° C. at 0.1 mm. for 18 hours and this material, consisting mostly of unreacted starting alcohol, is removed. The pot temperature is then raised to 95–100° C. and the balance of the material sublimed to give 5-(N-methylcarbamyloxymethyl) - 1,2,3,4,7,7 - hexachlorobicyclo[2.2.1]-2-heptene. This is used for pesticidal testing.

EXAMPLE 3

Preparation of 5(N,N-diethylcarbamyloxymethyl)-1,2,3,4,7,7-hexachlorobicyclo[2.2.1]-2-heptene of the structural Formula V (Method A)

To a solution of 0.1 mole of the allyl alcohol adduct in benzene or other nonpolar solvent is added 0.11 mole sodium hydride. When hydrogen evolution ceases, 0.1 mole of dimethylcarbamylchloride in the same nonpolar solvent used above is added slowly with stirring. The suspension is stirred at room temperature for 18 hours, then water is added and the mixture extracted with ether. The organic layer is dried, concentrated and the residual oil is sublimed, the unreacted starting alcohol sublimes at 50° C/0.1 mm. and the product comes off at about 100–150° C./0.1 mm.

EXAMPLE 4

Preparation of 5,6-bis-(carbamyloxymethyl)-1,2,3,4,7,7-hexachlorobicyclo[2.2.1]-2-heptene of the structural Formula III (Method A)

The butene 14 diol adduct is reacted as described earlier with 4.2 equivalents of sodium cyanate and 4.2 equivalents of trifluoroacetic acid in the same manner as described in Example 1. The product is sublimed and recrystallized from isopropyl ether identified as 5,6-bis-(carbamyloxymethyl)-1,2,3,4,7,7-hexachlorobicyclo[2.2.1]-2-heptene.

EXAMPLE 5

Preparation of 5-(N-N-diethylcarbamyloxymethyl)-1,2,3,4,7,7-hexachlorobicyclo[2.2.1]-2-heptene of the structural Formula V (Method B)

One tenth mole of hexachlorobicyclo[2.2.1]-2-heptene and 0.1 mole of N,N,diethylallylcarbamate are mixed together in 100 cc. of xylene. The mixture is removed. The product layer is distilled to purify the same yielding 5-(N,N-diethylcarbamyloxymethyl)-1,2,3,4,7,7 - hexachlorobycyclo[2.2.1]-2-heptene.

EXAMPLE 6

Preparation of 5-(carbamyloxymethyl)-1,2,3,4,7,7-hexachlorobicyclo[2.2.1]-2-heptene of the structural Formula III (Method C)

To an anhydrous ether solution of 0.1 mole of the allyl alcohol adduct of hexachloropentadiene, there is added dropwise and with stirring a solution of 0.15 mole of phosgene in anhydrous benzene maintaining the reaction mixture temperature between 10–25° C. After stirring for an additional hour, there is added slowly a solution of 0.15 mole of dimethylaniline in ether which is stirred for one hour. Filtration separates the aminehydrochloride. The filtrate (containing the chlorocarbamate) is added with cooling to 0.4 mole of aqueous ammonia. The reaction mixture is stirred for two hours, separated, dried and distilled, yielding 5-(carbamyloxymethyl)-1,2,3,4,7,7-hexachlorobicyclo[2.2.1]-2-heptene (Formula III).

EXAMPLE 7

Preparation of 5-(N,N-diethylcarbamyloxymethyl)-1,2,3,-4,7,7-hexachlorobicyclo[2.2.1]-2-heptene of the structural Formula V (Method C)

To the intermediate chlorocarbamate of Example 6 is added a solution of 0.4 mole of diethylamine in ether. The reaction mixture is stirred for one hour, filtered, then distilled to yield a prdouct identified as 5-(N,N-diethylcarbamyloxymethyl) - 1,2,3,4,7,7 -. hexachlorobicyclo-[2.2.1]-2-heptene.

INSECTICIDE TEST PROCEDURE

The following procedure was employed in testing the candidate pesticides according to the present invention.

House fly (drop test)

The test pesticides were diluted, using reagent acetone to an initial concentration as outlined in Table Ia. Preliminary biological screening consisted of 2 micrograms of the diluted pesticide per microliter of acetone applied topically to the dorsal thorax of each fly of a plurality of a susceptible strain of housefly (*Muscae domesticae*— L. Wilson strain), by means of a micrometer-driven syringe. Ten 4-day-old houseflies were placed in a petri dish with a wick soaked in milk. Three petri dishes of 10 houseflies each, constituted replicates for each pesticide. The results are shown in Table I.

A standard or control consisting of DDT in acetone alone; SK&F No. 23,228 alone in acetone; a control of reagent acetone; and an untreated check were included with each test run. Percent insect mortality was determined and recorded 24 hours after topical application. The compound was tested at least 4 times. The results are shown in Table I.

TABLE I.—DROP TEST FOR TOXICITY OF SK&F NO. 23,228* TO SUSCEPTIBLE FOUR-DAY-OLD FEMALE HOUSEFLIES; PESTICIDE APPLIED BY TOPICAL APPLICATION

| Active ingredient conc. | | Percent mortality in 24 hours, Wilson strain flies (average of at least 4 separate replicated tests) | | |
|---|---|---|---|---|
| Weight pesticide per volume acetone (percent w./v.) | In p.p.m. | SK&F 23228 | Reagent acetone alone | Untreated check |
| 0.018 | 180 | 23 | 7 | 3 |
| 0.0375 | 375 | 97 | | |
| 0.075 | 750 | 100 | | |
| 0.150 | 1,500 | 100 | | |
| 0.300 | 3,000 | 100 | | |
| 1.0 | 10,000 | 90 | | |

*N-methyl 5-carbamyloxymethyl-1,2,3,4,7,7-hexachlorobicyclo[2.2.1]-2-heptene

American cockroach (injection test)

SK&F No. 23,228 was diluted to an initial concentration of 2.5% using injection fluid as the solvent. Injection fluid is composed of 75% deobase, 10% xylene, 10% acetone, and 5% absolute ethanol. Injection was completed by way of the third coxal cavity. Dichlorodiphenyltrichloroethane (DDT) was used as the standard insecticide at a concentration of twelve microliters of 0.4% DDT for the females (giving 80% mortality), and eight microliters of 0.75% DDT for the males (giving about 100% mortality). The concentration for the standard insecticide was determined by the average body weight of each sex, females being heavier than males.

A control of injection fluid was run with each test as is an untreated check. Five males and five females were injected and placed in separate plum dishes according to their sex. Recording of mortality was made every twenty-four hours for seven days. Two initial runs were made at 2.5%. Test chemicals which displayed appreciable mortality were retested at lower dilutions of 1.0% and 0.5%.

The results of these screenings are shown in tabular form in Table II.

An Injection Test identical to that described above was run with SK&F No. 22,142. Dichlorodiphenyltrichloroethane (DDT) was used as the standard insecticide at a concentration of twelve microliters of 0.4% DDT for the females (giving 80% mortality), and eight microliters of 0.075% DDT for the males (giving about 100% mortality). The concentration for the standard insecticide was determined by the average body weight of each sex, females being heavier than males. Records of mortality were made every twenty-four hours, but only for three days. The results of these screenings are shown in tabular form in Table III.

TABLE II.—INJECTION TEST FOR TOXICITY OF SK&F NO. 23,228* TO AMERICAN COCKROACHES

| Active ingredient conc. | | Percent mortality in seven days (average of at least 4 separate replicated tests) | | | |
|---|---|---|---|---|---|
| Weight pesticide per volume inj. fluid (percent w./v.) | In p.p.m. | SK&F 23228 Female | SK&F 23228 Male | Injection fluid alone | Untreated check |
| 0.25 | 2,500 | 20 | 60 | | |
| 0.5 | 5,000 | 60 | 80 | | |
| 1.0 | 10,000 | 100 | 100 | | |
| 2.5 | 25,000 | 100 | 100 | 0 | 0 |

*N-methyl 5-carbamyloxymethyl-1,2,3,4,7,7-hexachlorobicyclo[2.2.1]-2-heptene

TABLE III.—INJECTION TEST FOR TOXICITY OF SK&F NO. 22,142* TO AMERICAN COCKROACHES

| Active ingredient conc. | | Percent mortality in 3 days (average of at least 4 separate replicated tests) | | | | |
|---|---|---|---|---|---|---|
| Weight pesticides per volume of inj. fluid (percent w./v.) | In p.p.m. | SK&F No. 22142 24 hrs. | SK&F No. 22142 48 hrs. | SK&F No. 22142 72 hrs. | Inj. fluid alone | Untreated check |
| 0.001 | 10 | 0 | 20 | 20 | | |
| 0.005 | 50 | 20 | 20 | 20 | | |
| 0.1 | 1,000 | 40 | 40 | 40 | | |
| 0.5 | 5,000 | 80 | 80 | 80 | | |
| 1.0 | 10,000 | 100 | 100 | 100 | | |
| 2.5 | 25,000 | 100 | 100 | 100 | 0 | 0 |

*5-Carbamyloxymethyl-1,2,3,4,7,7-hexachlorobicyclo[2.2.1]-2-heptene

What is claimed is:

1. A composition of matter having the structural formula:

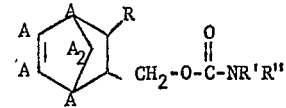

wherein
A is selected from the group consisting of hydrogen, chlorine and bromine, with at least four of the A's being a halogen;
R is selected from the group consisting of hydrogen, lower alkyl up to 5 carbon atoms, halogen, and $$-CH_2-O-\overset{O}{\underset{\|}{C}}-NR'R''$$

and both R' and R'' are selected from the group consisting of hydrogen, lower alkyl up to 5 carbon atoms, and phenyl.

2. A composition of matter having the structural formula:

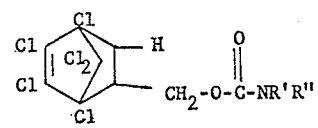

wherein
both R' and R'' are selected from the group consisting of hydrogen, alkyl up to 5 carbon atoms, and phenyl.

3. 5-Carbamyloxymethyl-1,2,3,4,7,7-hexachlorobicyclo[2.2.1]-2-heptene.

4. N-methyl 5 - carbamyloxymethyl-1,2,3,4,7,7-hexachlorobicyclo[2.2.1]-2-heptene.

5. N-ethyl 5-carbamyloxymethyl-1,2,3,4,7,7-hexachlorobicyclo[2.2.1]-2-heptene.

6. N-propyl 5 - carbamyloxymethyl-1,2,3,4,7,7-hexachlorobicyclo[2.2.1]-2-heptene.

References Cited

UNITED STATES PATENTS

| | | |
|---|---|---|
| 2,802,862 | 8/1957 | Senkbeil _____ 260—487 |
| 2,841,484 | 7/1958 | Johnson. |
| 2,841,485 | 7/1958 | Johnson et al. |
| 2,846,465 | 8/1958 | Boehme et al. |
| 2,994,710 | 8/1961 | Morales. |
| 3,190,911 | 6/1965 | Kilsheimer. |

LORRAINE A. WEINBERGER, *Primary Examiner.*

A. P. HALLUIN, *Assistant Examiner.*

U.S. Cl X.R.

167—30; 260—455, 463, 468, 471, 552, 553, 617